Nov. 15, 1932.    Z. O. ST. PALLEY    1,887,569
CASING FOR ELECTRICAL APPARATUS
Filed May 25, 1931
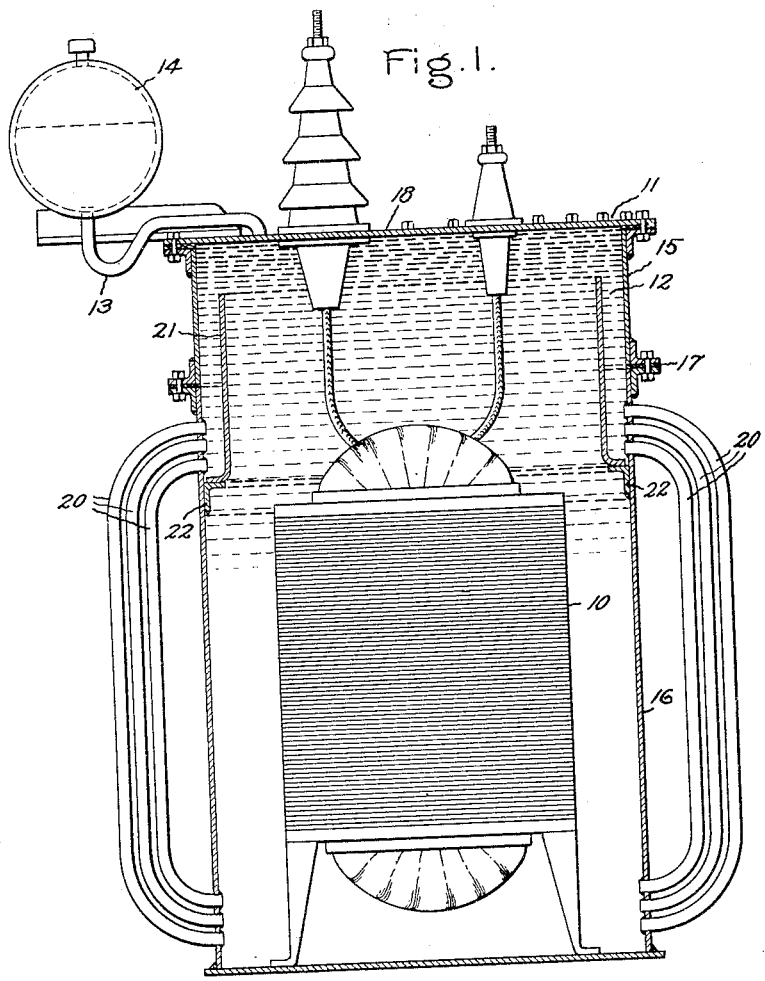
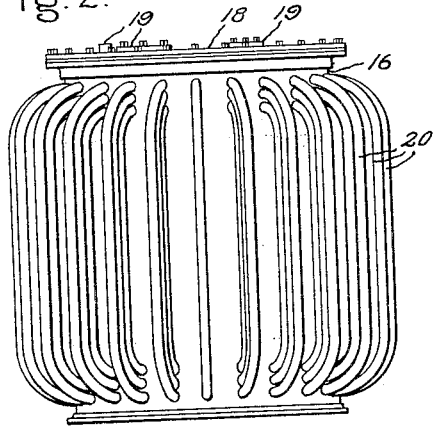
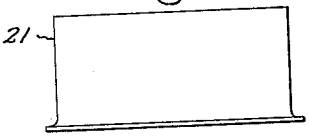
Inventor:
Zoltan O. St. Palley,
by Charles Mullen
His Attorney.

Patented Nov. 15, 1932

1,887,569

UNITED STATES PATENT OFFICE

ZOLTAN O. ST. PALLEY, OF PITTSFIELD, MASSACHUSETTS, ASSIGNOR TO GENERAL ELECTRIC COMPANY, A CORPORATION OF NEW YORK

CASING FOR ELECTRICAL APPARATUS

Application filed May 25, 1931. Serial No. 539,755.

My invention relates to casings for electrical apparatus and more particularly to casings adapted to hold an insulating and cooling liquid in which apparatus such as transformers and reactors are immersed. It is usually desirable to ship such apparatus immersed in its insulating liquid within its own tightly sealed casing so that the apparatus is protected during shipment from the oxygen of the air and from any moisture and dust in the air. Some apparatus of large capacity is so tall, however, that limitations due to railroad or other clearances prevent shipment of the apparatus when completely assembled or even with normally projecting bushings or other accessories removed. This difficulty has been overcome by forming the casing wall with a removable upper section which may be shipped separately, the apparatus being shipped in the lower section of the casing which may be filled with insulating liquid and closed and sealed by the cover of the casing or by a temporary cover used only during shipment. Such an arrangement is disclosed in the United States Patent No. 1,620,411 to Elmer J. Temple, issued March 8, 1927.

The load capacity of electrical apparatus, such as a transformer, is limited by its internal temperature and so the capacity may be increased by any provision of means for increasing the rate at which heat is dissipated from the apparatus. For this purpose, external heat radiators are often connected between the upper and lower parts of the apparatus casing, the heat from the apparatus being absorbed in the casing by the liquid which then flows through the radiators whence the heat is dissipated into the surrounding air. The heated liquid from around the apparatus will rise to the top of the casing and it should flow from here into the radiators to be cooled. In the case of a sectional walled casing such as has been referred to, however, if the radiators are connected to the casing near the top of its wall, then the upper section of the wall cannot be removed for shipment without detaching the radiators. It is often desirable that the radiators be shipped attached to the casing and filled with liquid and it is of course impractical to detach them if they are of the commonly used type in which they are permanently welded to the casing. The general object of the invention is to provide an improved arrangement of liquid immersed electrical apparatus within a sectional casing provided with heat radiators and arranged for efficient circulation of the cooling liquid through the casing and radiators.

The invention and its advantages will be better understood from the following description taken in connection with the accompanying drawing in which Fig. 1 is a sectional view of an encased liquid immersed transformer of the radiator type constructed in accordance with the invention; Fig. 2 is a view of the lower section of the transformer casing as it appears ready for shipment; Fig. 3 is a view of the upper section of the transformer casing; and Fig. 4 is a view of a baffle which is used in accordance with the invention to divert the flow of heated liquid between the transformer and the radiators.

Like reference characters indicate similar parts in the different figures of the drawing.

The invention will be described in connection with the transformer 10 shown in Fig. 1 of the drawing, but it will be apparent that it may be used in connection with other electrical apparatus which is immersed in a cooling liquid. The transformer 10 is enclosed in a casing 11 which is filled with an insulating and cooling liquid 12, this liquid extending through a pipe connection 13 and partially filling an expansion tank or conservator 14 to permit thermal expansion and contraction of the main body of liquid within the casing 11.

The casing 11 is formed with an upper section 15 and a lower section 16 connected by a liquid-tight joint 17, the joint being high enough to permit the transformer to be enclosed in the lower section 16 of the casing for shipment with the upper section 15 removed. During shipment the lower section 16 of the casing containing the transformer and filled with liquid may be closed and sealed by the main cover 18 of the casing or a temporary shipping cover may be used for this purpose. When the cover 18 of the casing is used, any openings for bushings, conservator connection or other accessories may be sealed by temporary plates 19 as indicated in Fig. 2.

The casing 11 is provided with vertical external heat radiators 20 through which the liquid 12 heated by the transformer may flow to be cooled. The radiators shown in the drawing are simple vertical tubes with their upper and lower ends bent and welded into openings in the wall of the casing 11, both ends of each tube being welded to the lower section 16 so that the tubes do not prevent or interfere with removal of the upper section 15 of the casing during shipment. The upper ends of the tubes 20 are preferably welded to the lower section 16 of the casing close to its upper edge and just below the joint 17 so that the tubes will be as long as possible and have a large heat radiating surface.

The liquid 12 which is heated by the transformer rises by convection and tends to collect in the upper part of the casing. After the part of the liquid above the upper ends of the tubes 20 has been heated, the heated liquid rising from the transformer tends to flow directly to the tubes so that there would be little effective circulation of the liquid above the tubes. To avoid this condition, a baffle or barrier 21 is provided between the transformer and the upper ends of the tubes 20. This baffle 21 is shown as a cylinder with its lower edge flanged outwardly and resting on a support 22 secured to the inner surface of the casing wall just below the upper ends of the tubes 20. The baffle 21, except at its lower edge, is spaced from the casing wall and extends upwardly beyond the upper ends of the tubes 20 and preferably well up toward the cover 18 of the casing. Unless the upper section 15 of the casing is very short, the baffle 21 preferably extends above the joint 17, but is easily removable to permit the cover 18 to be secured in place on the lower section 16, the upper section 15 of the casing and the baffle, shown in Figs. 3 and 4, being shipped separately. The bottom of the space between the baffle and the casing wall is substantially closed by the baffle flange and its support 22 to prevent any substantial flow of liquid, although it is not necessary that the joint between the baffle and the casing wall be liquid tight.

Any heated liquid rising from the transformer cannot flow directly to the tubes 20, but is diverted nearly to the cover 18 of the casing, thence over the upper edge of the baffle and down into the tubes through the space between the baffle and the casing wall. After being cooled in the tubes 20, the liquid returns into the lower part of the casing to rise again and absorb more heat from the transformer. The baffle 21 thus assures efficient circulation of the entire body of liquid even though the radiators be connected to the casing at a considerable distance below the top of the casing.

The invention has been explained by describing a particular form thereof as applied in connection with a transformer, but it will be apparent that various other forms and applications are possible without departing from the spirit of the invention and the scope of the appended claims.

What I claim as new and desire to secure by Letters Patent of the United States, is,—

1. The combination with electrical apparatus, of an enclosing casing containing a cooling liquid in which said apparatus is immersed, said casing having separable upper and lower sections, an external heat radiator with upper and lower connections to said lower casing section, said upper connection being below said upper casing section, said liquid filling said lower casing section and at least the lower part of said upper casing section, and means for diverting liquid flowing from said apparatus to said radiator into the part of said upper casing section near the upper part of said liquid.

2. The combination with electrical apparatus, of an enclosing casing containing a cooling liquid in which said apparatus is immersed, said casing having separable upper and lower sections, an external heat radiator with upper and lower connections to said lower casing section, said upper connection being below said upper casing section, said liquid filling said lower casing section and at least the lower part of said upper casing section, and a baffle spaced from the casing wall between said apparatus and said upper radiator connection, the lower end of the space between said baffle and casing wall being closed below said upper radiator connection to prevent flow of liquid, and said baffle extending upwardly to divert liquid flowing from said apparatus to said radiator into the part of said upper casing section near the upper part of said liquid.

3. The combination with electrical apparatus, of an enclosing casing containing a cooling liquid in which said apparatus is immersed, said casing having separable upper and lower sections, an external heat radiator with upper and lower connections to said lower casing section, said upper connection being below said upper casing section, said liquid filling said lower casing section and at least the lower part of said upper casing section, and a removable baffle spaced from the casing wall and extending above the joint between said two casing sections, the lower end of the space between said baffle and casing wall being closed below said upper radiator connection to prevent flow of liquid, and said baffle extending upwardly to divert liquid flowing from said apparatus to said radiator into the part of said upper casing section near the upper part of said liquid.

4. The combination with electrical apparatus, of an enclosing casing containing a cooling liquid in which said apparatus is immersed, said casing having separable upper and lower sections, a plurality of external heat radiators with upper and lower connections to said lower casing section, said upper connections being below said upper casing section, said liquid filling said lower casing section and at least the lower part of said upper casing section, and a removable cylindrical baffle spaced from the casing wall and extending above the joint between said casing sections, the lower end of the space between said baffle and casing wall being closed below said upper radiator connections to prevent flow of liquid, and said baffle extending upwardly to divert liquid flowing from said apparatus to said radiator into the part of said upper casing section near the upper part of said liquid.

5. The combination with electrical apparatus, of an enclosing casing completely filled with a cooling liquid in which said apparatus is immersed, said casing having separable upper and lower sections, an external heat radiator with upper and lower connections to said lower casing section, said upper connection being below said upper casing section, and means for diverting liquid flowing from said apparatus to said radiator into the upper part of said upper casing section.

In witness whereof, I have hereunto set my hand.

ZOLTAN O. ST. PALLEY.